March 12, 1940.  J. T. L. BROWN ET AL  2,193,087
METHOD AND APPARATUS FOR TESTING RECEIVERS
Filed Jan. 26, 1938
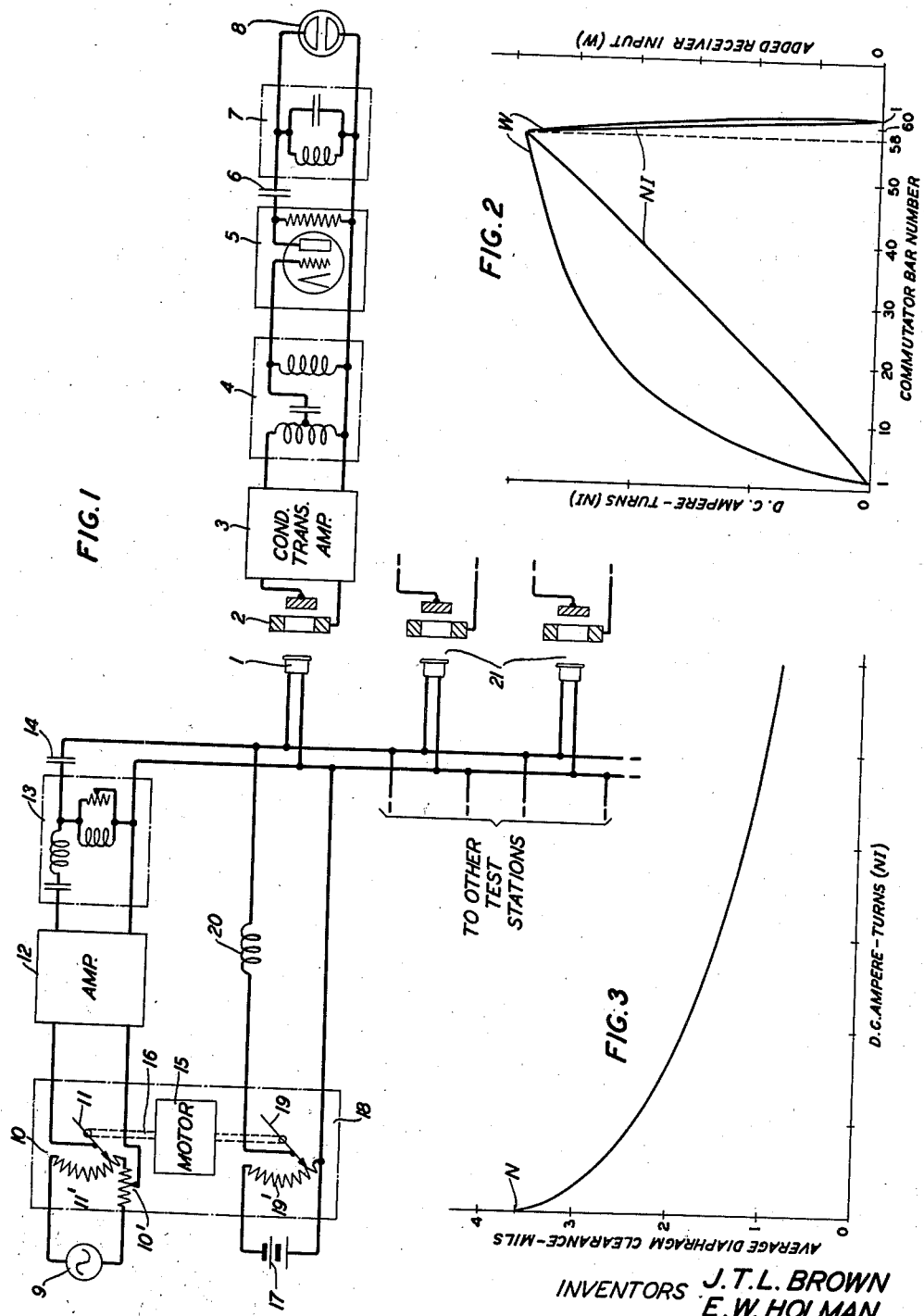
INVENTORS J. T. L. BROWN
E. W. HOLMAN
BY
*J. M. Campbell*
ATTORNEY Patented Mar. 12, 1940

2,193,087

UNITED STATES PATENT OFFICE 2,193,087

METHOD AND APPARATUS FOR TESTING RECEIVERS

John T. L. Brown, Staten Island, N. Y., and Erwin W. Holman, Tenafly, N. J., assignors to Bell Telephone Laboratories, Incorporated, New York, N. Y., a corporation of New York Application January 26, 1938, Serial No. 186,972

10 Claims. (Cl. 179—175.1)

This invention relates to a method and apparatus for testing telephone receivers for low diaphragm pole-piece clearance or for obstructions existing between the diaphragm and pole-pieces.

Telephone receivers which have an obstruction present between their diaphragms and pole-pieces are subject to a type of distortion known as "rattling." It is also possible that should a receiver have a normal diaphragm pole-piece clearance less than the permissible minimum, the diaphragm might strike the pole-pieces when vibrating at the higher amplitudes and under some circumstances may even become frozen to the pole-pieces.

Some of the principal causes for reduced effective diaphragm pole-piece clearance which results in rattling are reorientation of foreign particles on the pole-pieces, deformation of parts resulting from clamping pressures or mechanical jars and the air pressure which is produced on a diaphragm when the receiver is pressed against the ear. It is therefore highly desirable to have a means of determining from the finally assembled receiver whether or not such undesirable characteristics are apt to appear later in actual service. By normal clearance is here meant that clearance actually existing between the diaphragm and pole-pieces of an assembled receiver when no current is flowing through its pole-piece winding and not necessarily the clearance which should exist or was designed to exist between them.

The object of this invention is to provide a suitable method and apparatus which is independent of the inspector's personal skill and which will quickly and effectively indicate low diaphragm pole-piece clearance or the presence of an obstruction between the pole-pieces and diaphragm of a telephone receiver.

In attaining this object an apparatus and method is provided which steadily reduces the normal diaphragm pole-piece clearance at a predetermined rate, simultaneously passes an alternating current of substantially constant fundamental frequency through the pole-piece winding and automatically indicates the presence of harmonics generated by the diaphragm when it meets an obstruction.

It has been discovered through experiments that if a diaphragm is vibrating at a constant fundamental frequency and meets an obstruction on its pole-pieces or strikes the pole-pieces themselves, harmonics of that frequency will appear in the acoustic output while the fundamental frequency output diminishes greatly. Since the effect is substantially the same when the vibrating diaphragm strikes the pole-pieces as when it strikes a foreign obstruction the term "obstruction" will hereafter be understood to have that general meaning. For most receivers vibrating against an obstruction the second harmonic predominates in harmonic acoustic output energy. The method and apparatus would be the same, except for a necessary change in circuit constants, regardless of which harmonic predominated or was selected to indicate the presence of the obstruction.

In order to detect the presence of an obstruction which may exist anywhere within the entire workable amplitude range of the receiver, it is desirable that the diaphragm clearance be reduced below normal and in this invention it is preferred to reduce this clearance by adding to the magnetism of the permanent magnet pole-pieces. This is done by passing a direct current through the pole-piece windings.

The invention will be better understood by referring to the drawing in which:

Fig. 1 represents a schematic layout of the preferred form of apparatus;

Fig. 2 is a diagrammatic representation of typical characteristics of the direct current magnetizing and alternating current oscillator sources; and Fig. 3 shows a typical receiver clearance characteristic with average diaphragm clearance plotted as a function of the direct current ampere-turns.

Referring now to Fig. 1, the receiver 1 to be tested is positioned so that its acoustic output will be received by an associated condenser microphone 2. The output of the condenser microphone is amplified by a suitable amplifier 3 and fed into a selective circuit 4 which, together with the tuned resonator 7, will pass only the harmonic desired, for example, the second harmonic. A second amplifier 5 may be employed to increase the output of the harmonic passed by filter 4. This amplifier may be coupled to the selective resonator network 7 by condenser 6. A suitable indicator 8 is connected to the resonator 7 to indicate the presence of the selected harmonic and is preferably a glow tube although almost any type of volume or output indicator may be employed. From the foregoing description it will be evident that the fundamental frequency output will not give an indication at indicator 8 but should the vibrating diaphragm strike an obstruction, the selected harmonic thus produced will give an indication.

A suitable fundamental frequency, say 1400 cycles, is generated by oscillator 9, amplified by amplifier 12, carefully filtered by resonant filter 13 and impressed upon receiver 1 through coupling condenser 14. This latter condenser permits easy paralleling with the direct current supply from battery 17 by blocking any direct current flow into the resonant filter 13.

As previously pointed out, in order to properly perform a reliable test on a receiver, it is desirable that the clearance be diminished below that of normal to be sure that all possible future difficulties from obstruction in service will be anticipated. This is preferably accomplished by introducing with the alternating current fundamental input to the receiver an added direct current component which is properly poled to increase the permanent magnet field of the pole-pieces. Other methods may obviously be employed for this same purpose but the superimposed direct current seems to be the simplest and is preferable. A battery 17 furnishes the source for this direct current component. It is connected to a potentiometer 18 driven from shaft 16 which produces a substantially uniformly increasing direct current component for each cycle of rotation of its brush 19 over its associated resistance element 19'. The output of this potentiometer-battery combination is fed to the receiver coils through inductive reactor 20 which tends to smooth out the fixed steps of potentiometer 18. The direct current component thus impressed upon the receiver coils reduces the diaphragm clearance.

It has been found from experiments that when the diaphragm clearance has been reduced in the manner above described, the acoustic output of the receiver may fall off if supplied with only a constant power alternating current input. The initial input for normal clearance to produce the required receiver output for the test is obtained by adjusting rheostat 10' with brush 11 at its lowest or initial position. Then in order to keep this acoustic output substantially constant throughout the decreasing diaphragm clearance range, potentiometer 10 is provided, the brush 11 of which is driven by motor 15 through shaft 16. It is therefore evident that brush 11 and brush 19 are constantly in synchronism and by properly designing the resistance step of resistance element 11', the acoustic fundamental frequency output of the receiver to be tested may be kept substantially constant. It is not necessary that this acoustic output be kept absolutely constant just so its energy does not drop so low as to reduce the harmonic response below a detectable magnitude. However, for most receivers it is necessary to make some input compensation and it is obviously desirable to maintain the output as nearly constant as possible. Of course, if the acoustic output increases with decreasing clearance, potentiometer 10 will be the reverse of that shown in Fig. 1, or if it changes otherwise for certain types of receivers a corresponding change in potentiometer 10 must obviously be made.

Several other receivers 21 may be paralleled with receiver 1 and form new test stations. Although the same oscillator 9 and battery 17 with their associated equipments may be employed simultaneously for the several stations yet it is obvious that separate pick-up microphones and associated amplifiers, filters and signal means must be provided for each station.

In Fig. 2 the characteristics of the two motor driven potentiometers 10 and 18 are shown plotted against the common abscissae denoted as Commutator Bar Number. For the purpose of this specification it is assumed that both potentiometers have sixty steps or commutator bars. As indicated, fifty-eight of the steps or bars are employed in the increasing characteristic and the remaining two for the decreasing one. Considering first the direct current control it will be seen the ordinate scale is in terms of ampere-turns. It will also be observed that the ampere-turn curve NI increases uniformly in a substantially linear form from zero to its maximum. Its departure from the linear form is such as to give a nearly uniform decrease of clearance rate which is preferable. The magnetization produced by the direct current is also reduced in a substantially linear form from maximum at bar No. 58 to zero at bar No. 1. In this position it is ready to repeat its cycle.

As previously pointed out, it is desirable that the acoustic output be kept nearly constant. Therefore, as the ampere-turn magnetization is increased by potentiometer 18 to decrease the diaphragm clearance potentiometer 10 must continuously add enough additional alternating current energy to compensate for the decreased acoustic efficiency of the receiver. The ordinate scale denoted, Added Receiver Input refers only to the added power input rather than the total power input. Resistance element 11' is designed to give the characteristic W while resistance element 19' is designed to simultaneously produce the characteristic NI as shown in Fig. 2. The effect on the diaphragm clearance by a change in magnetism produced by the ampere-turns NI is shown by Fig. 3 in which the diaphragm clearance characteristic for an average receiver is disclosed. Point N on this curve denotes the normal clearance when no current is flowing in the receiver coils.

In using this testing device the initial alternating current input to the receiver is adjusted by rheostat 10' for the type of receiver to be tested. Motor 15 is started and rotates shaft 16 approximately 60 revolutions per minute although any other suitable speed may be used. The receivers 1 and 21 to be tested are positioned before their respective pick-up microphones 2. If an obstruction is met by a diaphragm anywhere along its decreasing clearance range the selected harmonic is generated and operates the corresponding signal 8 as before described. If signal 8 does not operate the receiver has satisfactorily passed the test.

What is claimed is:

1. The method of testing a receiver comprising reducing the diaphragm-pole-piece clearance at a predetermined rate, simultaneously passing an alternating current of substantially constant, fundamental frequency through the windings on said pole-pieces and observing the presence of harmonics of said fundamental frequency appearing in the acoustic output of the receiver.

2. The method of testing a receiver comprising reducing the diaphragm-pole-piece clearance at a predetermined rate by passing a variable direct current through the windings on said pole-pieces, simultaneously superimposing upon said direct current an alternating current of substantially constant, fundamental frequency, and observing the presence of harmonics of said fundamental frequency appearing in the acoustic output of the receiver.

3. The method of testing a receiver comprising reducing the diaphragm-pole-piece clearance at a predetermined rate by passing a variable direct current through the windings on said pole-pieces, simultaneously superimposing upon said direct current an alternating current of substantially constant, fundamental frequency, controlling said alternating current to give substantially constant acoustic output from the receiver throughout the range of said reducing clearance, and observing the presence of harmonics of said fundamental frequency appearing in the acoustic output of the receiver.

4. In a device for testing a receiver, means for reducing the normal diaphragm-pole-piece clearance at a predetermined rate, supply means connected to the windings on said pole-pieces adapted to supply said windings with an alternating current of substantially constant, fundamental frequency, and indicating means for detecting the presence of harmonics of said fundamental frequency appearing in the acoustic output of the receiver.

5. In a device for testing a receiver, controlling means connected to the pole-piece windings thereof for controlling a variable direct current to reduce the diaphragm-pole-piece clearance at a predetermined rate, superimposing means connected to said windings adapted to superimpose upon said direct current an alternating current of substantially constant, fundamental frequency, and indicating means for detecting the presence of harmonics of said fundamental frequency appearing in the acoustic output of the receiver.

6. In a device for testing a receiver, controlling means connected to the pole-piece windings thereof for controlling a variable direct current to reduce the diaphragm-pole-piece clearance at a predetermined rate, superimposing means connected to said windings adapted to superimpose upon said direct current an alternating current of substantially constant, fundamental frequency, a second controlling means adapted to control said alternating current to give substantially constant acoustic output from the receiver throughout the range of said reducing clearance, and indicating means for detecting the presence of harmonics of said fundamental frequency appearing in the acoustic output of the receiver.

7. In a device for testing a receiver, controlling means connected to the pole-piece windings thereof for controlling a variable direct current to reduce the diaphragm-pole-piece clearance at a predetermined rate, superimposing means connected to said windings adapted to superimpose upon said direct current an alternating current of substantially constant, fundamental frequency, a second controlling means adapted to control said alternating current to give substantially constant acoustic output from the receiver throughout the range of said reducing clearance, and gas-filled glow tube indicating means for detecting the presence of harmonics of said fundamental frequency appearing in the acoustic output of the receiver.

8. In a device for testing a receiver having in combination a potentiometer, a source of current connected to the input terminals of said potentiometer and an inductive reactor connected in series with the output terminals of said potentiometer and the pole-piece coil of said receiver, said combination being adapted to periodically supply to said coil a substantially smooth and uniformly increasing direct current whereby the diaphragm-pole-piece clearance will be periodically reduced at a uniform rate.

9. In a device for testing a receiver having in combination a potentiometer, a source of constant frequency alternating current connected through a rheostat to the input terminals of said potentiometer, an amplifier connected to the output terminals of said potentiometer, a resonant filter connected to the output terminals of said amplifier and adapted to pass only the frequency of said frequency source and a coupling condenser adapted to couple the output terminals of said filter to the coils of said receiver, said combination being adapted to periodically supply to said receiver coils a periodically varying power input of constant frequency.

10. In a device for testing a receiver, controlling means connected to the pole-piece windings thereof for controlling a variable direct current to reduce the diaphragm-pole-piece clearance at a predetermined rate, superimposing means connected to said windings adapted to superimpose upon said direct current an alternating current of substantially constant, fundamental frequency, and a second controlling means adapted to control said alternating current to give substantially constant acoustic output from the receiver throughout the range of said reducing clearance.

JOHN T. L. BROWN.
ERWIN W. HOLMAN.